(12) United States Patent
Iida et al.

(10) Patent No.: US 6,591,576 B1
(45) Date of Patent: Jul. 15, 2003

(54) STRUCTURAL MEMBER HAVING CLOSED SECTIONS, AND APPARATUS AND METHOD FOR PRODUCING THE STRUCTURAL MEMBER

(75) Inventors: Masataka Iida, Toyota (JP); Masahiko Takeuchi, Toyota (JP); Sadao Ishihara, Okazaki (JP); Takanori Matsukura, Nishikamo-gun (JP); Takayuki Furuhata, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 09/666,143

(22) Filed: Sep. 20, 2000

(30) Foreign Application Priority Data

Sep. 21, 1999 (JP) .............................. 11-267470
Aug. 23, 2000 (JP) ........................ 2000-252214

(51) Int. Cl.⁷ ................................. E04C 3/30
(52) U.S. Cl. ................... 52/731.6; 52/731.2; 52/731.9; 52/731.6; 52/735.1; 52/737.6
(58) Field of Search ............................. 52/731.1, 731.2, 52/731.9, 731.6, 735.1, 737.6

(56) References Cited

U.S. PATENT DOCUMENTS

| | | | | |
|---|---|---|---|---|
| 1,649,922 A | * | 11/1927 | Paull | |
| 5,080,427 A | * | 1/1992 | Sturrus et al. | 296/188 |
| 5,395,036 A | * | 3/1995 | Sturrus | 228/146 |
| 5,454,504 A | * | 10/1995 | Sturrus | 228/17 |
| 5,566,874 A | * | 10/1996 | Sturrus | 228/17 |
| 5,580,120 A | * | 12/1996 | Nees et al. | 296/146.6 |
| 5,813,594 A | | 9/1998 | Sturrus | |
| 5,934,544 A | * | 8/1999 | Lee et al. | 228/146 |
| 6,217,089 B1 | * | 4/2001 | Goto et al. | 293/102 |
| 6,240,820 B1 | * | 6/2001 | Sturrus et al. | 83/188 |

FOREIGN PATENT DOCUMENTS

| | | |
|---|---|---|
| EP | 0 449 599 B1 | 9/1993 |
| EP | 0870649 A2 | 10/1998 |
| EP | 0870649 A3 | 9/1999 |
| JP | 59-39422 | 3/1984 |
| JP | 9-271847 | 10/1997 |
| JP | 10-278706 | 10/1998 |

OTHER PUBLICATIONS

European Abstract for Application # 00120539.2

* cited by examiner

Primary Examiner—Carl D. Friedman
Assistant Examiner—Yvonne M. Horton
(74) Attorney, Agent, or Firm—Pillsbury Winthrop LLP

(57) ABSTRACT

A structural member having a closed section, and an apparatus and a method for producing the same are provided to decrease production costs and secure the dimensional accuracy by a simple construction. The apparatus produces a structural member provided with a channel-shaped sectional portion and closed sectional portions adjacent thereto by bending a work and includes a press mold formed of a punch and a die oppositely installed and used for press-forming so that both side edges of the work are caused to overlap on the bottom wall of the channel-shaped sectional portion, and a fall-down prevention means which prevents both side edges opposed to each other of the work to be press-formed in the press mold from falling down and guides both side edges so that the end faces thereof are brought into contact with each other. Since the die applies a compression force to the work due to the end faces of the work brought into contact with the fall-down prevention means being pressed to each other, a curved portion having a residual compression stress between the longitudinal outer side wall and the vertical outer side wall is formed.

1 Claim, 10 Drawing Sheets

US 6,591,576 B1

STRUCTURAL MEMBER HAVING CLOSED SECTIONS, AND APPARATUS AND METHOD FOR PRODUCING THE STRUCTURAL MEMBER

BACKGROUND OF THE INVENTION

1. Technical Field of the Invention

The present invention relates to a structural member having a closed section, and an apparatus and a method for producing the structural member. More particularly, the invention relates to a structural member formed of a plate-like work and having a channel-shaped sectional portion and two closed sectional portions for which both side walls of the channel-shaped sectional portion are commonly shared, and an apparatus and a method for producing a structural member having such a closed section.

2. Description of Related Art

A bumper reinforcement which constitutes an automobile bumper has been known as this type of the structural member. As has been disclosed in Japanese Patent Publication Laid-Open No. Hei 10-278706, the bumper reinforcement is attached and fixed by inserting the tip end portion of the side members of an automobile into the channel-shaped sectional portion, and this is bent or curved in compliance with the shape of a bumper which constitutes a part of the design of the automobile.

Referring to FIG. 17, the channel-shaped sectional portion 51 of a bumper reinforcement is defined by the bottom wall 60 formed substantially at the middle of a plate-shaped work W' (FIG. 11), and boundary walls (side walls) 61 each forming a boundary to a closed sectional portion 52 formed by bending the plate-shaped work from the respective ends of the bottom wall 60. Also, the closed sectional portion 52 is defined by the boundary walls 61, a longitudinal inner side wall 62 located at the automobile side when the plate-shaped work is bent from the respective ends of the boundary wall 61 and attached to and fixed at a side member, a vertical outer side wall 63 located outside the automobile in the vertical direction when the plate-shaped work is bent from the longitudinal inner side wall 62 and attached to and fixed at the side member, and a longitudinal outer side wall 65 located at the opposite side of the automobile when being bent from the vertical outer side wall 63, causing the side edges of the work to overlap on the bottom wall 60 of the channel-shaped sectional portion 51 and being attached to and fixed at the side member. The respective sidewalls 60, 61, 62, 63, and 65 are formed to be planar, and the walls adjacent to each other are bent to be approximately perpendicular to each other Further, the names of these bottom wall 60, boundary wall 61, longitudinal inner side wall 62, vertical outer side wall 63, and longitudinal outer side wall 65 are used as only reference in order to describe a structural member having a closed section in the invention, but they do not intend to limit the patterns in use. It is noted that the longitudinal direction, vertical direction or the inside and outside positions may differ in compliance with actual applications.

When producing such a bumper reinforcement, generally, as shown in FIG. 11 through FIG. 18, plate-shaped work W' is prepared (FIG. 11), and the position which falls between the boundary wall 61 and the longitudinal inner side wall 62 of the work W' is bent to form so as to secure the shape of work W11 (FIG. 12). Also, the position which falls between the bottom wall 60 of the work W11 and the boundary wall 61 is bent to form it to secure the shape of the work W12 in which the channel-shaped sectional portion 51 is formed (FIG. 13), and the position which falls between the longitudinal inner side wall 62 and vertical outer side wall 63 of the work W12 is bent into a form so as to secure the shape of work W13 (FIG. 14). Next, the position which falls between the vertical outer side wall 63 and the longitudinal outer side wall 65 is slightly bent into a form so as to secure the shape of work W14 (FIG. 15). Thereafter, the position which falls between the vertical outer side wall 63 and the longitudinal outer side wall 65 is completely bent so that the side edges of the work W14 are caused to overlap on the bottom wall 60 of the channel-shaped sectional portion, thereby securing the shape of work W15 (FIG. 16) Further, a process of forming the work W11 through W15 shaped as shown in FIG. 12 through FIG. 16 from the plate-shaped work W' is carried out by press-forming so that the respective bent portions form almost perpendicular ridge lines. The width of the plate-shaped work W' is set so as to form adequate intervals so that end faces Wa, Wa at both side edges which are caused to overlap on the bottom wall 60 of the channel-shaped sectional portion 51 are not buckled by being brought into contact with each other. The work W15 bent as shown in FIG. 16 is finally curved or bent along its length in compliance with the design of an automobile bumper and is formed to the shape of work W16 (see FIG. 18). However, in order to evade various problems such as warping, undulating, or opening of the side edges of the work W15, which may occur in the lengthwise bending or curving process, after the work W11 through W15 is bent so as to become straight or linear in its lengthwise direction in the respective steps shown in FIG. 12 through FIG. 16, the side edges of the work W15 are welded to the bottom wall of the channel-shaped sectional portion where the side edges of the work W15 are caused to overlap each other (FIG. 17). In the final process of a series of steps, the structural member is generally bent, along its length at a fixed curvature radius R1, by press-forming from a shape shown with the chain line in FIG. 18 to a shape shown with a solid line therein, whereby the structural member is formed to the shape of work W16.

On the other hand, Japanese Patent Publication Laid-Open No. Sho 59-39422 discloses a method for producing a box-shaped structural member constructed so that a plate-shaped material which is shaped like a channel by a bottom wall and both side walls is set in a channel-shaped sectional portion of a die, both side walls are folded and bent while applying an axial force thereto by a rotating bending punch, the end faces of the free end portions are opposed to each other, and the tip end faces opposed to each other are welded to each other.

That is, in the invention described above, a production method has been researched and developed, in which both end faces of the free end portions are run into each other at the middle point in the width direction by folding a plate member, an upper die and a lower die are used to process as described above, wherein since a material folded to be like a channel in advance is folded and bent, the angle of the free end portions become inevitably large at the corner portion, and the free end portions may fall down inside. That is, the tip end faces of the free end portions are run into each other in the process of formation, wherein the free end portions may become horizontal before they are completely worked, or if the free end portions are pressed to the end, they are caused to fall down inside. That is, it is difficult to fold and bend the work to a desired shape, and no actual application has been brought about. This is described therein (from page 1, 5$^{th}$ line in the right lower column, of the Publication to Page 2, 3$^{rd}$ line in the right upper column thereof).

Therefore, the aforementioned invention has been made in view of the above situations, wherein, in the embodiment thereof, a stopper is provided on the folding and bending surface of a bending punch rotatably supported on the upper wall of a die via a pin, and as the bending punch is turned downward, the free end portions are pressed to the side wall of the channel-shaped sectional portion by the stopper (that is, an axial force is applied to the bending portion), and it is described that the free end portions are folded and bent to become horizontal in this state.

However, in those prior arts described above and shown in FIG. 11 through FIG. 18, in order to evade problems such as warping, undulating, etc., of the work W15 which may occur in the process of folding or bending along its length, a structural member is welded after being folded or bent so as to become linear in its lengthwise direction. After that, bending or folding in the lengthwise direction must be carried out separately from the above processes. Therefore, the number of processes is increased, and the processes are cumbersome, wherein facilities are required to execute the processes. Such a problem arises, by which the production costs can not be decreased.

Further, in this example, adequate intervals are formed so that the end faces Wa, Wa are not buckled due to being brought into contact with each other when both side edges of the work W15 are caused to overlap on the bottom wall 60 of the channel-shaped sectional portion 51. Therefore, since intervals between both end faces Wa, Wa may vary due to a bending angle, another problem arises, by which dimensional accuracy thereof cannot be improved.

Still further, in this example, the work W15 bent and formed to become linear is welded to prevent a problem such as warping, etc., wherein since the sectional shape thereof changes due to pressing for the purpose of bending or folding in executing press-forming work when carrying out a bending or folding process in the lengthwise direction, in which, after that, such a problem arises, by which dimensional accuracy cannot be improved on the other hand, Japanese Laid-Open Patent Publication No. Sho 59-39422 of the aforementioned prior arts discloses a method for producing a box-shaped structure having a rectangular section, which is different from a structural member having a closed section formed by the present invention. And, an apparatus disclosed to produce a box-shaped structural member has a bending punch rotatably supported therein, and a stopper is provided on the folding and bending surface, wherein the construction is complex.

Also, in a production method for which the apparatus is used, the tip end faces of the free end portions are brought into contact with the stopper by turning and shifting down the bending punch, whereby the stopper functions so that the free end portions are pressed to the side wall of the channel-shaped sectional portion and are folded and bent so as to become horizontal. That is, with the aforementioned invention, the tip end faces at both sides of the free end portions of a plate-shaped material are brought into contact with the stoppers respectively installed on the folding and bending surface of the bending punch. Therefore, the free end portions may be spaced by the distance between both stoppers when the free end portions are folded and bent so as to become horizontal. Accordingly, such a problem arises as in the prior arts shown in FIG. 11 through FIG. 18, by which dimensional accuracy cannot be improved. And, in the case where the tip ends of the free end portions of both side walls of the plate-shaped member are brought into contact with each other, it is difficult to form the plate-shaped material to such a width that the tip end faces of the plate-shaped material are not brought into contact with each other, wherein the plate-shaped material is buckled since the pressing force cannot be relieved due to the side wall being planar when the tip end faces are brought into contact with each other.

And, as described in the aforementioned prior arts, where a material folded to be channel-like in advance is folded and bent by using an upper die and a lower die, and the free end portions thereof are aligned with each other during the formation, the free end portions become horizontal before the lower die and upper die are completely pressed, and if these are completely pressed to the end, the free end portions are folded inside, whereby it becomes difficult for the free end portions to be folded and bent to a predetermined shape, and it is impossible to apply the method in practical use.

SUMMARY OF THE INVENTION

The present invention was developed in view of the above problems and shortcomings, and it is therefore an object of the invention to provide a structural member having a closed section, and an apparatus and a method for producing the structural member, which can decrease production costs with a simple construction, and at the same time, can improve the dimensional accuracy.

In order to achieve the object, a structural member having a closed section according to the first aspect of the invention is characterized in that the structural member is formed of a plate-like work and has a channel-shaped sectional portion and two closed sectional portions for which both side walls of the channel-shaped sectional portion are shared, wherein the two closed sectional portions are formed so as to overlap the bottom wall of the channel-shaped sectional portion in such a state where aide edge portions of two bending pieces bent from both side walls of the channel-shaped sectional portion to the outside thereof are brought into contact with each other at the end faces thereof, each of the respective closed sectional portions is constructed as a planar portion that connects the portions adjacent to the side wall of the channel-shaped sectional portion to the side walls at a right angle, and a curved portion which is curved toward the planar portion with the end face of the side edge portion made into the top and keeps a compression stress remained in the curving direction is disposed between the planar portion and the side edge portion.

In the invention described according to the first aspect of the invention, the end faces at both side edge portions, opposed to each other, of a work are caused to overlap the bottom wall of the channel-shaped sectional portion in a state where the end faces are brought into contact with each other, and a compression stress is left at the curved portions continuous from the end faces of the side edge portions. Therefore, the shape of the closed sectional portion is kept unchanged.

In order to achieve the abovementioned object, an apparatus for producing a structural member having a closed section according to the second aspect of the invention is an apparatus for producing a structural member formed of a plate-like work and having a channel-shaped sectional portion and two closed sectional portions for which both side walls of the channel-shaped sectional portion are shared, and is characterized in that the apparatus includes a press mold formed of a punch and a die oppositely installed, which forms both side edges of the work by press forming so that both side edges are caused to overlap on the bottom wall of the channel-shaped sectional portion, a fall-down prevention means for guiding both side edges so that the end faces of the both side edges are brought into contact with each other by preventing falling of the opposed both side edges of the work to be press-formed in the press mold; the die of the press mold has a shape such that a compression stress is generated at the closed sectional portion by pressing the end faces of a work, which are brought into contact with each other by the fall-down prevention means when executing the press-forming.

In the invention according to the second aspect of the invention, when both side edges of a work is caused to overlap the bottom wall of the channel-shaped sectional portion in a state where the end faces of the channel-shaped sectional portion are brought into contact with each other, the end faces of the work can be securely opposed to each other by the fall-down prevention means, thus generating a compression stress at the closed sectional portion without fail.

In order to achieve the object, according to the third aspect of the invention, a method for producing a structural member formed of a plate-like work and having a channel-shaped sectional portion and two closed sectional portions for which both side walls of the channel-shaped sectional portion are shared is characterized in that the method includes a pre-step of forming a primary processed work equipped with the channel-shaped sectional portion and bent pieces bent from both side walls of the channel-shaped sectional portion toward the outside thereof at a right angle in the work; an intermediate step of forming a secondary processed work approximating the closed sectional portion by bending the side edges of the respective bent pieces of the primary processed work at an appointed position; and a post-step of forming the closed sectional portions by press-forming so that the end faces at both side edges, opposed to each other, of the secondary processed work are caused to overlap the bottom wall of the channel-shaped sectional portion in a state where the end faces are brought into contact with each other, and forming curved portions constituting the closed sectional portions by generating a compression stress at the work by pressing the end faces of the work, which are brought into contact with each other, to each other.

In the invention according to the third aspect of the invention, since the pre-step, intermediate step and post-step are systematically combined, it is possible to produce a structural member having a closed section with good efficiency and accuracy.

In order to achieve the abovementioned object, a method for producing a structural member having a closed section according to one preferred form of the third aspect of the invention is characterized in that, in addition to the invention as set forth in the third aspect thereof, the work is curved in the lengthwise direction thereof in the pre-step or intermediate step.

In the invention according to one preferred form of the third aspect of the invention, since the work is not bent in the lengthwise direction in the post-step, the sectional shape thereof is kept unchanged.

DETAILED DESCRIPTION OF THE PREFERRED EMBODIMENT

Figure 9:
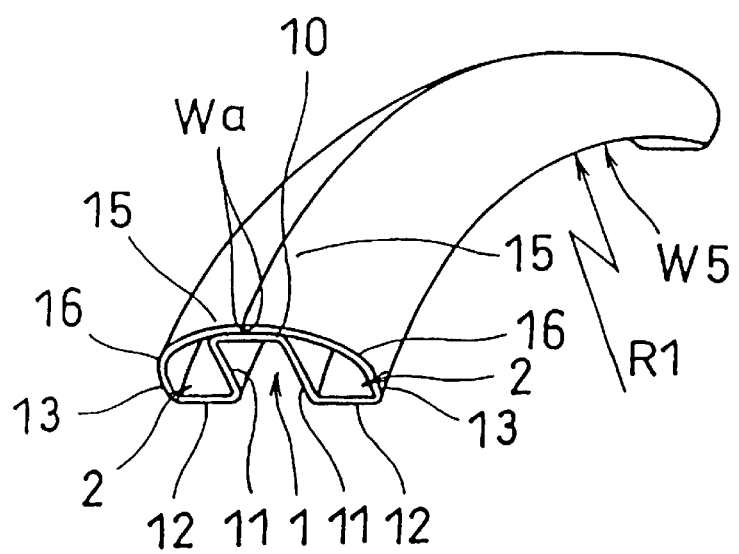
FIG. 9 is a perspective view showing the final shape of the structural member according to the invention.

First, a detailed description is given of an embodiment of a structural member having a closed section, which is applied to a bumper reinforcement constituting an automobile bumper, according to the present invention, mainly with reference to FIG. 9.

A structural member having a closed section according to the invention is provided substantially with a channel-shaped sectional portion 1 formed by bending a plate-shaped work W (FIG. 4), and closed sectional portions 2, 2 adjacent to the channel-shaped sectional portion 1, in which the end faces Wa, Wa at opposed side edges of the work W are brought into contact with each other, and simultaneously both side edges are caused to overlap on the bottom wall 10 of the channel-shaped sectional portion 1, such that a continuous curved portion 16 is formed between a longitudinal outer side wall 15 and a vertical outer side wall 13, constituting the closed sectional portions 2.

Figure 4:
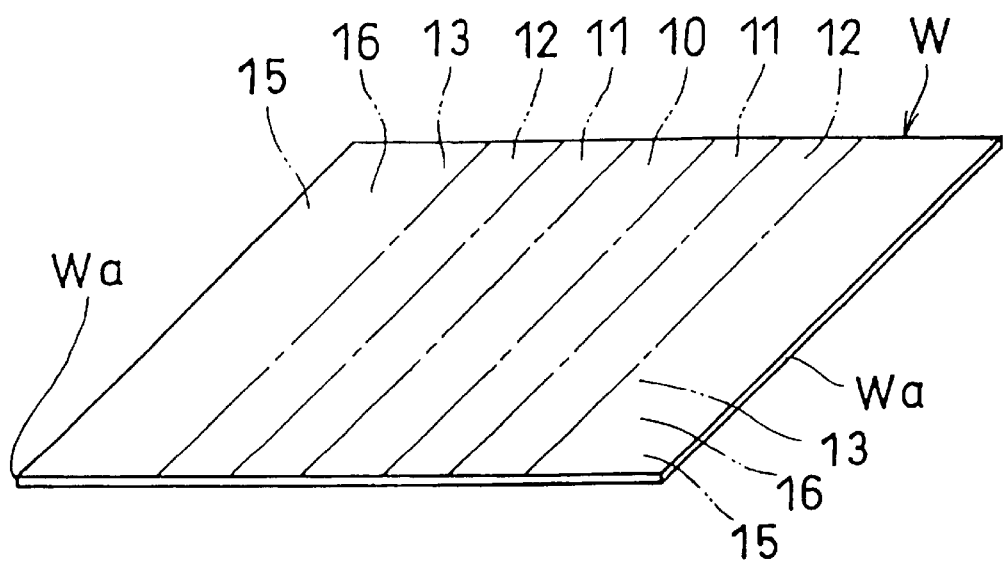
FIG. 4 is a perspective view showing a shape of plate-shaped work before molding, which is used in the invention.

Referring to FIG. 4, the work W is originally formed into a rectangular plate in a plan view. The plate-shaped work W is bent along chain lines from almost the center toward both side edges subsequently. Finally, as shown in FIG. 9, the work W is composed of a channel-shaped sectional portion 1 defined by the bottom wall 10 and boundary walls (side walls) 11 each bent from the bottom wall 10 and forming boundaries with the closed sectional portions 2, in which the tip end portion of a side member (not illustrated) of an automobile is inserted, attached and fixed, the boundary walls 11, longitudinal inner side walls (planar portion) 12 bent from the boundary walls 11 and located at the automobile side when being attached and fixed to the side member, a vertical outer side wall 13 located in the vertical direction of the automobile, and longitudinal outer side wall 15, which is located at the side opposed to the automobile side, bent via the curved portion 16 from the vertical outer side wall 13. That is, herein, closed sectional portions 2, 2 will be disposed at the upper and lower parts of the channel-shaped sectional portion 1 adjacent thereto. The respective side edges of the work W constituting the longitudinal outer side wall 15 in a state where the end faces Wa, Wa of both side edges are pressed to each other and brought into contact with each other are partially caused to overlap on the bottom wall 10 of the channel-shaped sectional portion 1 and are finally fixed together by welding or the like in a state where the end faces Wa, Wa at both side edges are brought into contact with and pressed to each other. Further, as shown in FIG. 9, the work W to be formed as a bumper reinforcement is curved along its length at a fixed curvature radius R1 in compliance with the shape of a bumper constituting a part of the design of the automobile.

Figure 1:
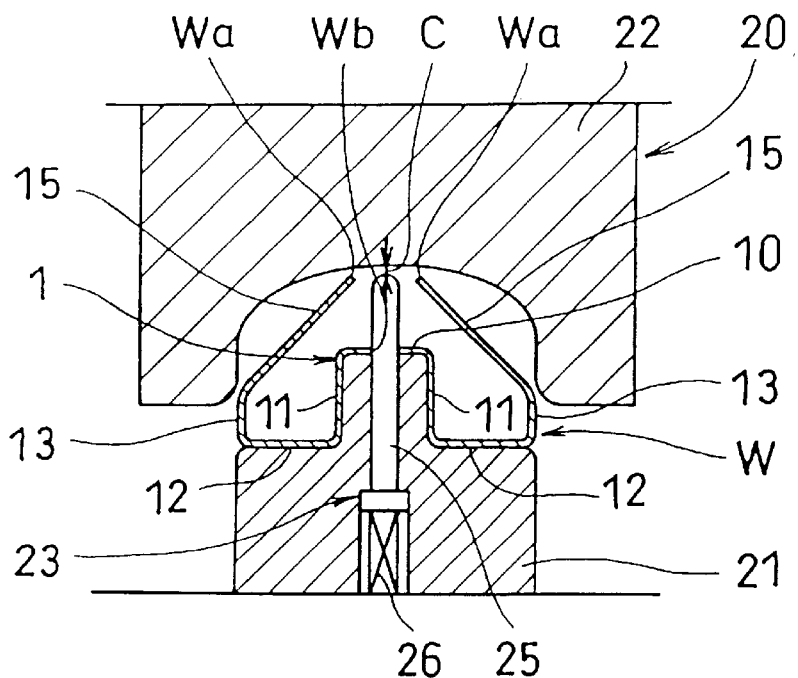
FIG. 1 is a cross-sectional view showing the major parts of an apparatus for producing a structural member according to one embodiment of the invention.
Figure 2:
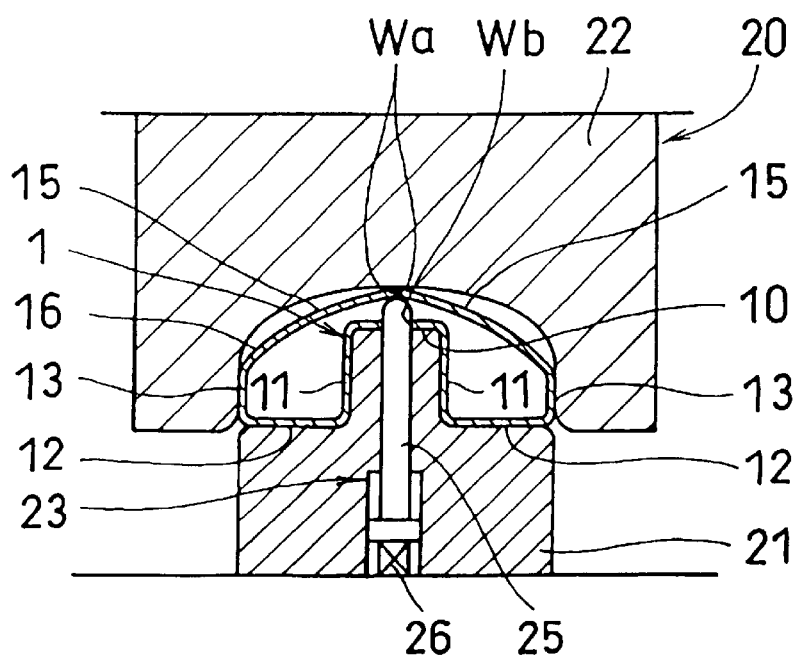
FIG. 2 is a cross sectional view showing a state where the end faces of the work are brought into contact with each other by shifting a die down from the state shown in FIG. 1.
Figure 3:
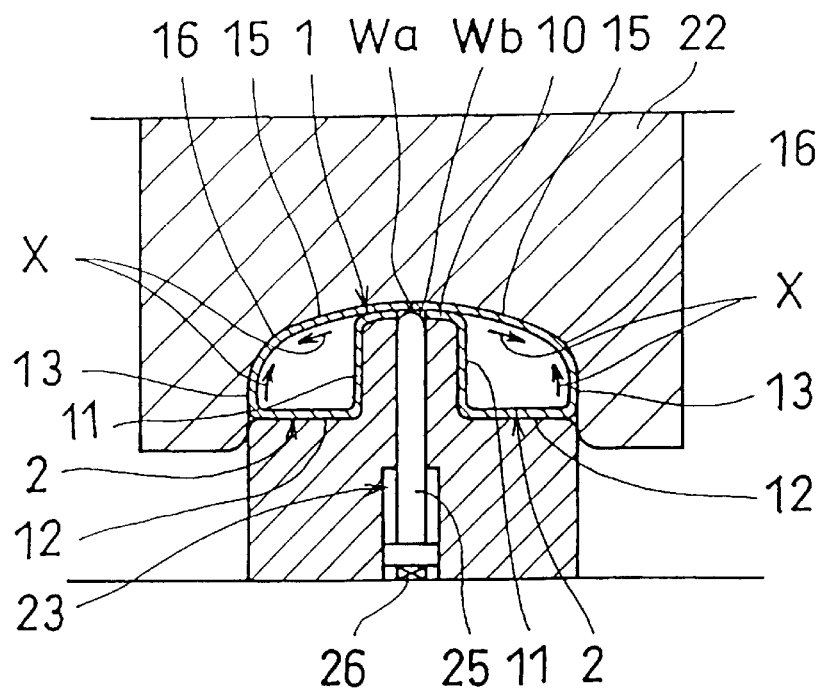
FIG. 3 is a cross sectional view showing a state where press-forming of the work is completed by further shifting the die down from the state shown in FIG. 2.
Figure 8:
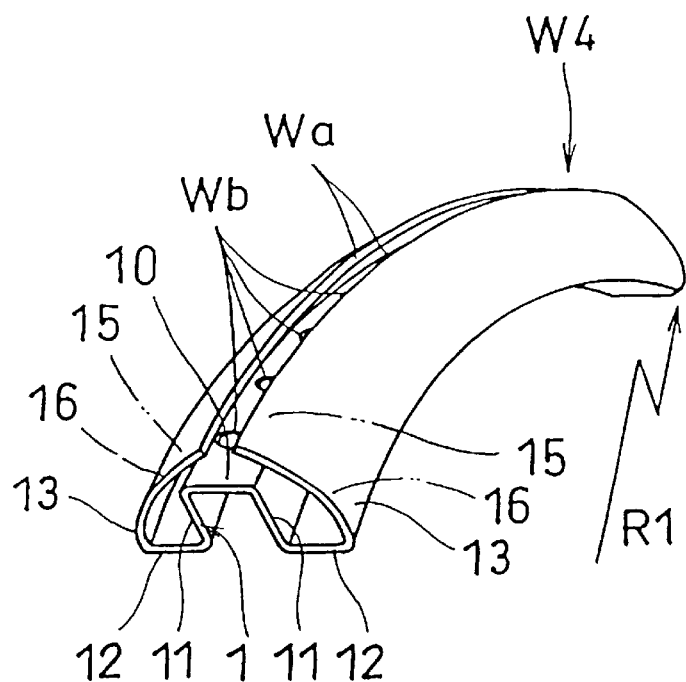
FIG. 8 is a perspective view showing the shape of the work in which the second half of the intermediate step has been finished.

Next, a description is given of an embodiment of an apparatus for producing a structural member having a closed section according to the present invention referring to FIG. 1 through FIG. 3, based on a case of production of the structural member having a closed section as described above. An apparatus for producing a structural member having a closed section according to the invention is used for producing the work W5 shaped as shown in FIG. 9 by press-forming the work W4 shaped as shown in FIG. 8. Generally, it is an apparatus for producing a structural member, which is formed of a channel-shaped sectional portion 1 and closed sectional portions 2, 2 adjacent thereto by bending the plate-shaped work W. That is, the apparatus is formed of a press mold 20 having a punch 21 and a die 22 oppositely arranged for press-forming so that both side edges of the work W4 are caused to overlap on the bottom wall 10 of the channel-shaped sectional portion 1, and fall-down prevention means 23 which guides the end faces wa, Wa so as to be brought into contact with each other by preventing fall-down of both opposed side edges of the work 4 press-formed in the press mold 20. The die 22 of the press mold 20 is shaped so as to allow formation of the continuous curved portion 16 between the longitudinal and vertical outer side wall is and 13 that constitute the closed sectional portions 2,2 by applying the compression stress to the work W4 through pressing action between the end faces Wa, Wa of the work W4 contacted by the fall-down prevention means 23 during press-forming.

Referring to FIG. 8, the work W4 has a channel-shaped sectional portion 1 defined by the bottom wall 10 and both boundary walls 11, 11; the longitudinal inner side walls 12; and the vertical outer side wall 13, which constitute a part of the closed sectional portion 2 including the boundary walls 11, which are formed in advance. As shown in FIG. 1, both side edges where the curved portion 16 and the longitudinal outer side wall 15 are formed are opposed to each other, and the work W4 is slightly bent from the vertical outer side wall 13. The length from the position, where the work 4 is bent from the vertical outer side wall 13, to the end faces Wa of both side edges, that is, the length of both side edges to form the curved portion 16 and the longitudinal outer side wall 15 is set such that, when the die 22 and the punch 21 are relatively proximal to each other and the work W4 in the press die 20 is press-formed, the end faces Wa, Wa of the work W4 are brought into contact with each other and pressed to each other, and are pressed to the die 22, producing a compression stress between the vertical outer side wall 13 and the longitudinal outer side wall 15. Further, in this case, the work W4 is already curved along its length at a fixed curvature radius R1, and has holes Wb, Wb in the bottom wall 10 of the channel-shaped sectional portion 1, into which fall-down prevention pins 25 (described later) of the fall-down prevention means 23 are inserted.

In the embodiment, the punch 21 is disposed on the bed or bolster (not illustrated) of a press, and a die 22 is disposed in a ram (not illustrated) such that press-forming is executed by causing the die 22 to shift down with respect to the work W4 placed on the punch 21. The punch 21 is molded in compliance with the shapes of the bottom wall 10, boundary walls 11 and longitudinal inner side wall 12 of the channel-shaped sectional portion 1 of the work W4 formed as shown in FIG. 8. Meanwhile when press-forming to have the longitudinal outer side wall 15 overlapped on the bottom wall 10 of the channel-shaped sectional portion 1 in a state where the end faces Wa, Wa of the work W4 are brought into contact with each other, the die 22 is shaped to allow formation of the continuous curved portion 16 between the vertical outer side wall 13 and the longitudinal outer side wall 15 by applying a compression stress therebetween.

In addition, the fall-down prevention means 23 is formed of fall-down prevention pins 25 inserted into the holes Wb formed in the bottom wall 10 of the channel-shaped sectional portion 1, and a compression spring 26 which resiliently presses the fall-down prevention pin 25 so that each tip end thereof protrudes toward the die 22. Therefore, a plurality of fall-down prevention means 23 may be provided along the length of the work W4. In order to guide the end faces Wa, Wa of the work W4 so as to be brought into contact with each other between the tip end of the fall-down prevention pin 25 and the underside of the die 22 approaching when the ram is shifted down, a clearance retainer means (not illustrated) to retain clearance C equivalent to the plate thickness of the work W4 is connected to the fall-down prevention pins 25. The clearance retainer means can be constructed so that the fall-down prevention pin 25 is allowed to shift down in synchronization with the die 22 against a pressing force of the compression spring 26 with the clearance C kept with respect to the underside of the die 22, by employing an advance pressing pin generally provided in a press apparatus.

Next, a detailed description is given of a method for producing a structural member having a closed section according to the invention, based on a case of producing the aforementioned structural member having a closed section using the aforementioned production apparatus, mainly with reference to FIG. 4 through FIG. 9.

A method for producing a structural member having a closed section according to the invention is a method for producing a structural member having a closed section, which is formed of a channel-shaped sectional portion 1 by bending a plate-shaped work W and closed sectional portions 2, 2 adjacent thereto. The method includes a pre-step of obtaining a work (primary processed work) W2 by forming a channel-shaped sectional portion 1 defined by the bottom wall 10 and the boundary portions 11, 11 bent therefrom to form the boundaries between the channel-shaped sectional portion 1 and the closed sectional portions 2, and longitudinal inner side walls 12 bent from the corresponding boundary walls 11 to constitute the closed sectional portions 2; a vertical outer side wall forming step (intermediate step) for obtaining a work (secondary processed work) W4 by forming the vertical outer side wall 13 constituting the closed sectional portions 2 by bending the work W2 having the longitudinal inner side wall 12 at a predetermined position such that the compression stress can be applied in the subsequent step; and a curved portion forming step (post-step) of forming a longitudinal outer side wall 15 constituting the closed sectional portions 2 by press-forming the end faces Wa, Wa at both opposed side edges of the work W4 having vertical outer side wall 13 so as to be overlapped on the bottom wall 10 of the channel-shaped sectional portion 1 in a state where the end faces Wa, Wa are brought into contact with each other, and obtaining a work W5 by forming a curved portion 16 continuously extending between the vertical outer side wall 13 and the longitudinal outer side wall 15, which constitute the closed sectional portions 2 resulting from applying compression stress to the work W4 through pressing action between the pressed end faces Wa, Wa of the work W4. In addition, the works W, W1, W2, or W3 are curved in the lengthwise direction in the pre-step or the intermediate step (the vertical outer side wall forming step).

As shown in FIG. 4, the work W is originally made planar in a plan view. The width H between the end faces Wa, Wa at both side edges forms the channel-shaped sectional portion 1 and closed sectional portions 2,2. It is dimensioned such that a compression stress can be applied when the end faces Wa, Wa are brought into contact with each other as described above. The work W is bent at the positions shown by chain lines in FIG. 4 in the subsequent processes, respectively.

Figure 5:
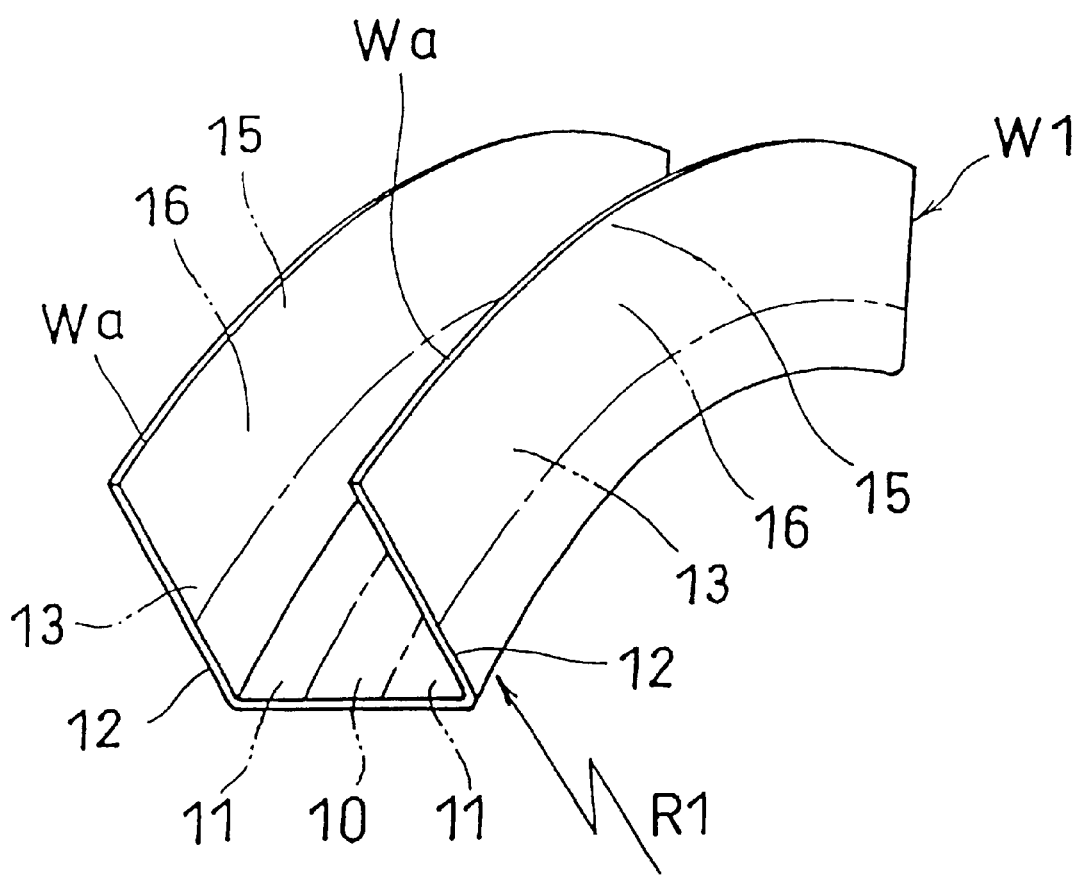
FIG. 5 is a perspective view showing the shape of the work in which the first half process of the pre-step of forming a channel-like sectional portion has been finished in the plate-like work illustrated in FIG. 4.
Figure 6:
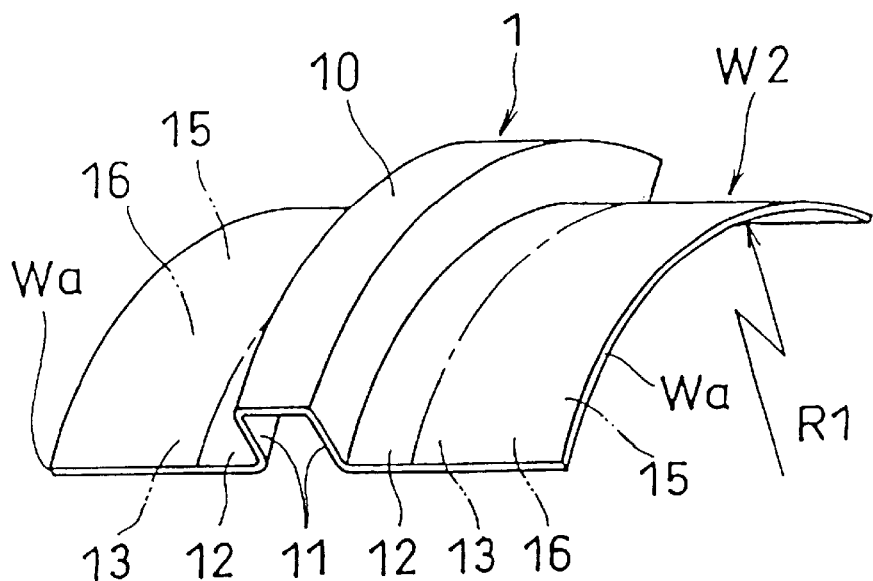
FIG. 6 is a perspective view showing the shape of the primary processed work in which the second half process of the pre-step has been finished.

Referring to FIG. 5, first, the work W is almost perpendicularly bent at the positions between the portions which will become the boundary walls 11 and the longitudinal inner side walls 12. It is further curved at a fixed curvature radius R1 along its length, resulting in the work W1. Then as shown in FIG. 6, the work W1 is almost perpendicularly bent at the positions between the portions which will become the bottom wall 10 and the boundary walls 11, thus forming the work W1 into the work W2 with the shape having the channel-shaped sectional portion 1 formed therein. At this time, since the parts between the portions which will become the boundary walls 11 and the longitudinal inner side walls 12 are bent in advance, the longitudinal inner side walls 12 are concurrently formed. In the pre-step of the invention, the work W2 is shaped as shown in FIG. 5 and FIG. 6.

Figure 7:
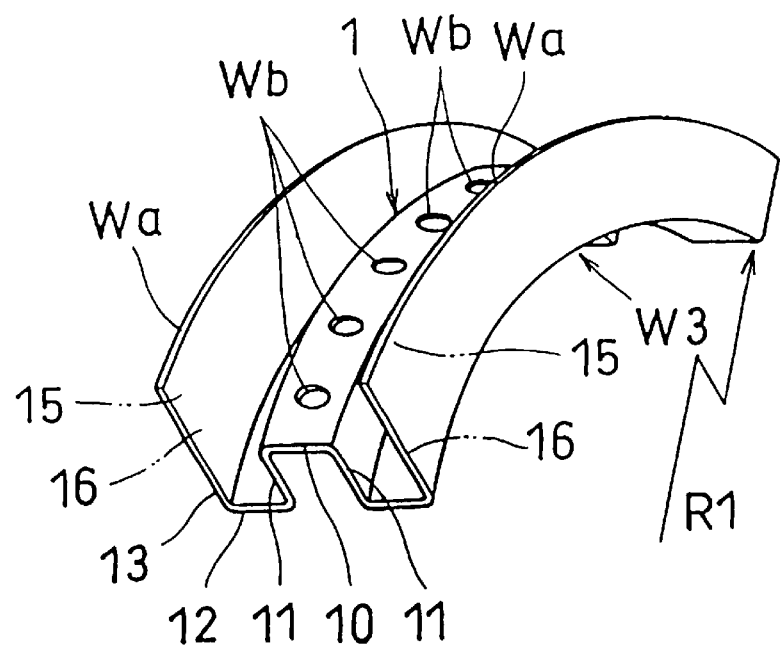
FIG. 7 is a perspective view showing the shape of the work in which the first half process of the intermediate step to form the secondary processed work from the primary processed work has been finished.

Next, in order to obtain the work W3 as shown in FIG. 7 from the work W2 by carrying out the intermediate step of the invention, the work W2 is almost perpendicularly bent at positions between the portions which will become the longitudinal inner side walls 12 and the vertical outer side wall 13. Then holes Wb are formed in the bottom wall 10 of the channel-shaped sectional portion 1, through which fall-down prevention pins 25 are inserted. Further, the positions to be bent between the portions which will become the longitudinal inner side walls 12 and the vertical outer side wall 13 are set such that, when the end faces Wa, Wa at both opposed side edges of the work W4 in the post-step described later are press-formed so as to be overlapped on the bottom wall 10 of the channel-shaped sectional portion 1 in a state where the end faces Wa, Wa are brought into contact with each other, a continuous curved portion 16 can be formed between the vertical outer side wall 13 and the longitudinal outer side wall 15 by applying a compression stress to the work W4 through pressing action between end faces Wa, Wa of the work W4. Further, lengthwise bending and curving of the work W1, W2 or W3 or drilling of holes Wb to receive the fall-down prevention pins 25 therethrough are not limited to examples of the aforementioned embodiment so long as they are completed before the commencement of the post-step to be executed next. This pre-step and the intermediate step may be carried out by press-forming.

Subsequently, in order to obtain the work Wd as shown in FIG. 8 from the work W3 by carrying out the post-step of the invention, portions which become curved portions 16 formed between the vertical outer side wall 13 and the longitudinal outer side wall 15 are, respectively, bent at slightly larger than the right angle so that the end faces Wa, Wa can overlap on the bottom wall 10 of the longitudinal outer side wall 15 by a subsequent press-forming in a state where the end faces Wa, Wa are brought into contact with each other. As shown in FIG. 1, the work W3 is set on a punch 21 in a state where the fall-down prevention pins 25 are inserted into the holes Wb formed in the bottom wall 10, in which the die 22 is shifted down to obtain the work W4 by press-forming. At this time, referring to FIG. 2, since the fall-down prevention pins 25 are shifted down in synchronization with the die 22 in a state where fixed clearance C equivalent to the plate thickness of the work W4 is retained between the tip ends thereof and the die 22, the end faces Wa, Wa at both side edges of the work W are brought into contact with each other while being, respectively, guided by the clearance C.

Then, as the die 22 is further shifted down, the work W4 in pressed to the inner surface of the die 22 during application of the compression stress thereto as shown by arrows X, X (FIG. 3) since the end faces Wa, Wa at both side edges are caused to overlap on the bottom plate 10 of the channel-shaped sectional portion 1 in a state where the end faces Wa, Wa are pressed to each other, whereby, as shown in FIG. 3, continuous curved portions 16, in which the end faces Wa, Wa at both side edges are made into the top thereof, are formed between the vertical outer side wall 13 and the longitudinal outer side wall 15. Unless the positions between the portions which will become the longitudinal inner side walls 12 and the vertical outer side wall 15 are bent so that they form almost a right angle, since the longitudinal outer side wall 15 are caused to overlap on the bottom wall 10 of the channel-shaped sectional portion 1 while the end faces Wa, Wa of the work W4 are being pressed to each other, the portions can be bent at almost a right angle upon the completion of press-forming. Thus, production of the structural member is completed, wherein since a compression stress is devised so as to be applied to the curved portion 16 in the post-step described above, the compression stress may be left at the corresponding curved portion 16, the longitudinal outer wall 15 is prevented from being subjected to spring-back even though the die is opened, whereby the shape of closed sections 2, 2 can be fixed.

Still further, even in a case where the final shape of a structural member is a bumper reinforcement bent or curved along its length in compliance with the shape of a bumper which constitutes the design of an automobile, since lengthwise bending or curving of any one of the work W, W1, W2 or W3 can be carried out at the same time when the bending thereof is carried out in the pre-step or the intermediate step, the number of processes can be decreased. As a result, the production cost can be reduced. Still further, since the work W or the like is bent (in the case of the example of embodiment) in a state where it is curved in advance at a fixed curvature radius R1 along its length, no wrinkle occurs in the work W, no side edge is folded inside, and no sectional shape is collapsed or deformed, whereby the dimensional accuracy of the vertical outer side wall 13 and the longitudinal outer side wall 15 which constitute the closed sectional portions 2, and finally the dimensional accuracy of the structural member having a closed section can be improved.

Figure 10:
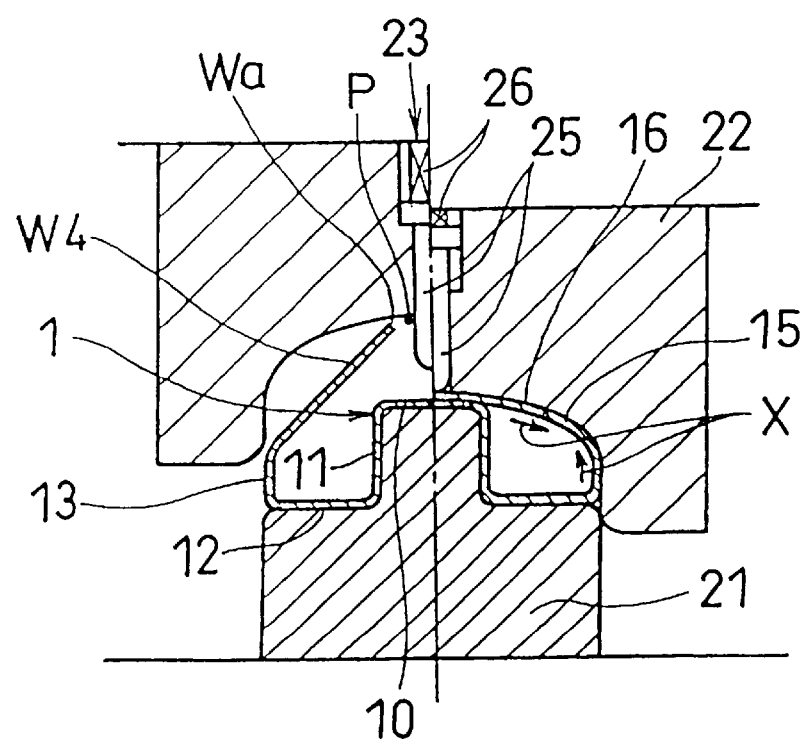
FIG. 10 is a sectional view showing the major structure of an apparatus for producing a structural member according to another embodiment of the invention.
Figure 11:
FIG. 11 is a perspective view showing the shape of the plate-like work, before molding, which has been generally used.
Figure 12:
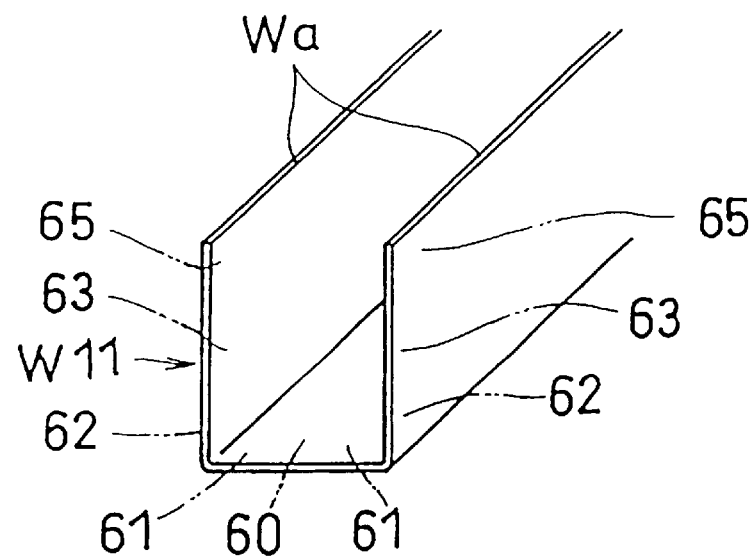
FIG. 12 is a perspective view showing the shape of the conventional work in which the first half of the pre-step of forming the channel-like sectional portion from the plate-like member illustrated in FIG. 11 has been finished.
Figure 13:
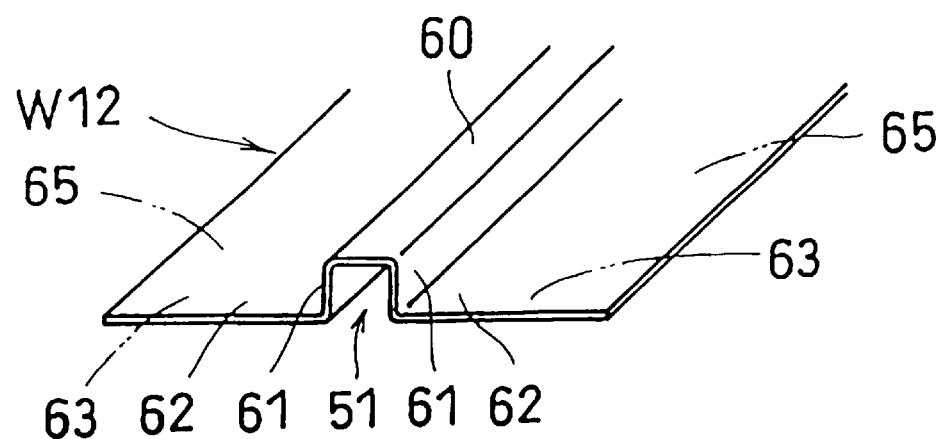
FIG. 13 is a perspective view showing the shape of the conventional work in which the second half process of the pre-step has been finished.
Figure 14:
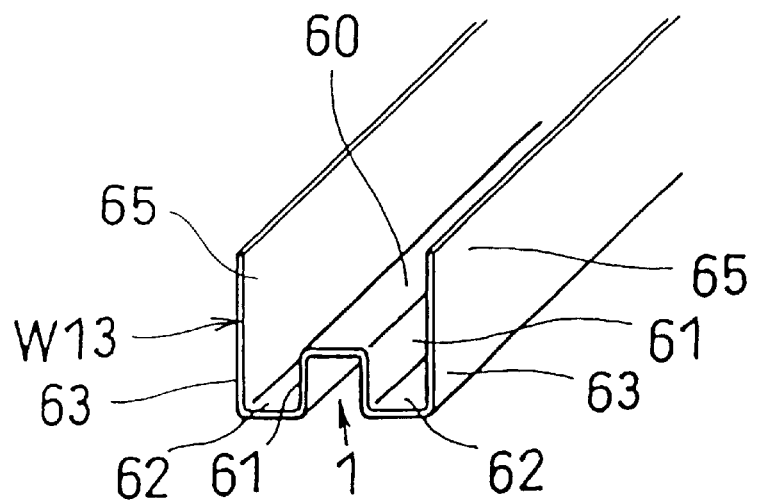
FIG. 14 is a perspective view showing the shape of the conventional work in which the first half process of the intermediate step of further forming the work after the pre-step has been finished.
Figure 15:
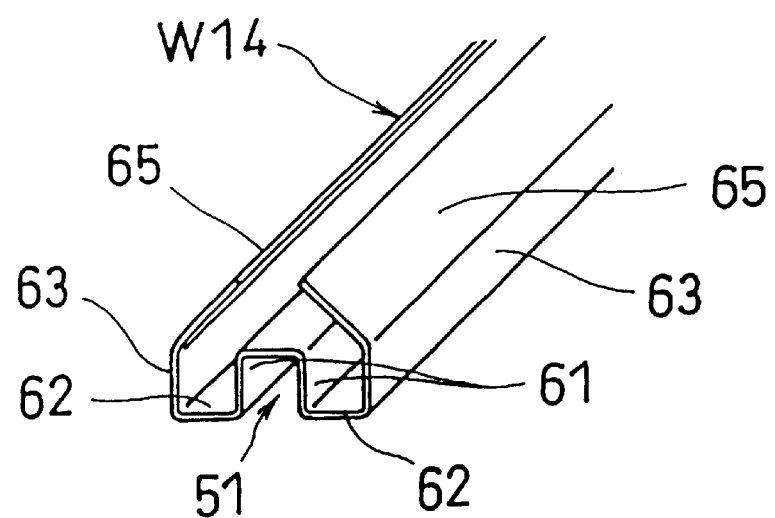
FIG. 15 is a perspective view showing the shape of the conventional work in which the intermediate step has been finished.
Figure 16:
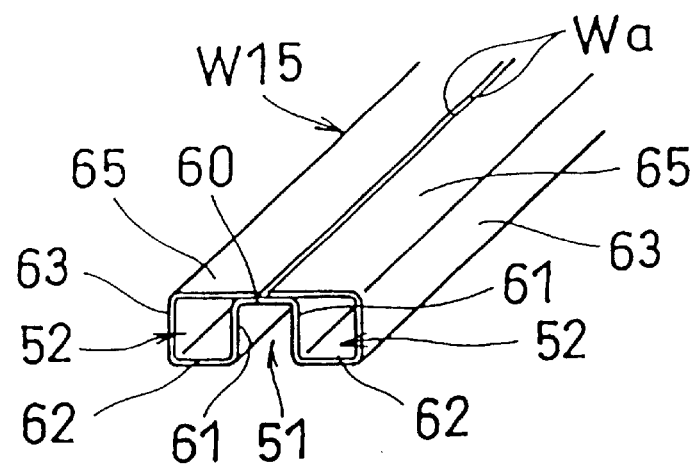
FIG. 16 is a perspective view showing the final shape of the conventional structural member.
Figure 17:
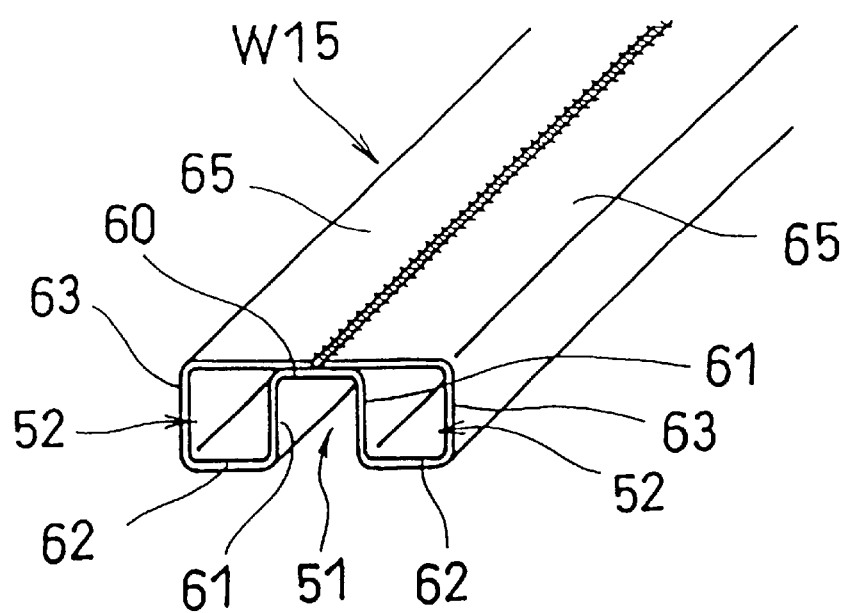
FIG. 17 is a perspective view showing the shape of tho conventional product in which the shape of the structural member illustrated in FIG. 16 is fixed by welding.
Figure 18:
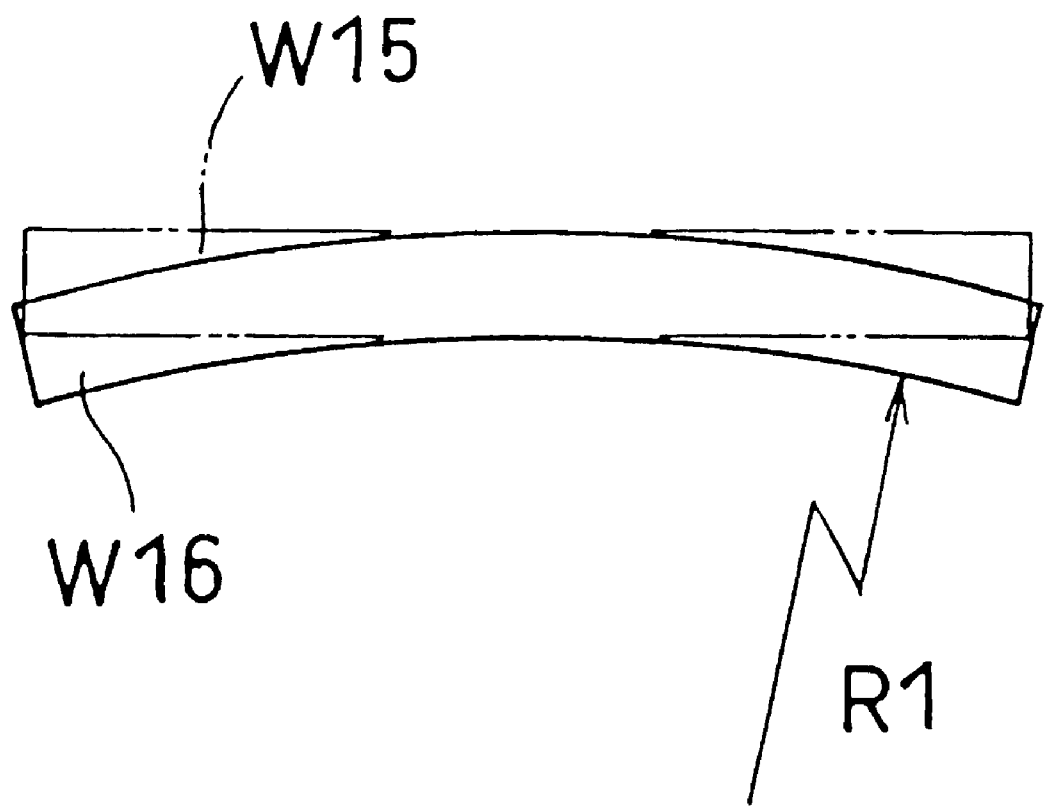
FIG. 18 is a perspective view showing the shape of the conventional product in a state where a straight work is curved in the lengthwise direction from the state illustrated in FIG. 17.

In the abovementioned embodiment, a fall-down prevention means 23, which can prevent falling of both side edges, opposed to each other, of the work W4 and can guide the end faces Wa, Wa so that the end faces Wa, Wa are brought into contact with each other, is provided at the punch 21 side of a press mold 20 (FIG. 1 through FIG. 3). However, the fall-down prevention means 23 may be provided at the die 22 side as shown in FIG. 10. In this case, a fall-down prevention pin 25 which constitutes the fall-down prevention means 23 is retained by the die 22 so that the tip end portion thereof usually protrudes an appointed length from the inner face of the die 22, and the rear side thereof is pressed by a compression spring 26. When press-forming, at the beginning, work W4 (secondary processed work, FIG. 8) obtained in the intermediate step as described above is set on the punch 21. But, here, since the fall-down prevention means 23 is disposed at the die 22 side, it is not necessary to form a hole Wb, into which the fall-down prevention pin 25 is inserted, in the secondary processed work W4. However, if the hole Wb is used as a blank hole to lighten the weight, it doesn't matter.

As the die 22 is fallen down after the secondary processed work W4 is set on the punch 21, first, the tip ends (end faces) Wa, Wa at both side edges of the work W move in a direction along which both approaches, while being guided by the underside of the die 22, and the end faces are brought into contact with the protrusion root P of the fall-down prevention pin 25, which protrudes from the die 22, whereby the movement of the end faces is stopped. (See the left half of FIG. 10). After that, the die 22 is further fallen down. Then, since the movement of the tip ends at both side edges of the work W4 is stopped, the work W4 gradually deforms the portion continuous from both side edges toward the inside of the die 22. And, on the way of the deformation, the tip end of the fall-down prevention pin 25 is brought into contact with the bottom wall 10 of the channel-shaped section portion 1 of the work W, wherein the fall-down prevention pin 25 is raised opposite to the descent of the die 22. Finally, the tip ends at both side edges of the work W slides along the radius surface 25a at the tip end of the fall-down prevention pin 25, wherein the tip ends of the work W advances under the corresponding fall-down prevention pin 25 while slightly raising the pin 25 against a pressing force of the compression spring 26, and the end faces Wa, Wa are brought into contact with each other.

Thereafter, the die 22 reaches the bottom dead point of a press, and both side edges of the work W are caused to overlap the bottom wall 10 of the channel-shaped sectional portion 1 while pressing the respective end faces Wa, Wa each other. Concurrently both side edges of the work W are pressed to the inner face of the die 22 while giving the compression force as shown by the arrow X, X, wherein a continuous curved portion 16 will be formed between the vertical outer wall 13 and the longitudinal outer wall 15 with the end faces Wa, Wa of both side edges made into the top (See the right half of FIG. 10). Therefore, a compression stress may be remained in the curved portion 16 by application of the compression force as in the abovementioned embodiment. The longitudinal outer wall 15 can be prevented from being subjected to spring-back even though the die is opened, and the shape of the closed sections 2, 2 are fixed. Also, in this embodiment, since the fall-down prevention pin 25 is not inserted into the secondary processed work W4, the shape of the pin 25 may be decided optionally. For example, it may be replaced by a bar-like member extending in the lengthwise direction of the work W4.

The shape of the work W5 molded as described above is normally fixed by fixing the bottom wall 10 of the channel-shaped sectional portion 1 and the longitudinal outer wall 15 overlapped thereon by welding. However, since the longitudinal outer wall 15 of the structural member is composed of a curved portion 16 having a residual compression stress, no delay fracture which frequently becomes a problem in high-tension materials will be produced even though a cheap caulking method is employed instead of a welding method. And, in the abovementioned embodiment, since a structural member is bent or curved in the lengthwise direction in the pre-step or the intermediate step in advance, and a press-forming is carried out so that the bottom wall 10 of the channel-shaped sectional portion 1 is caused to overlap the longitudinal outer wall 12 in the step for forming the curved portion (post-step), no warping or undulation are generated. And, no problem occurs, such as separation (or spacing) of the bottom wall 10 from the longitudinal outer side wall 15 before fixing the shape.

Also, the invention is not limited to a bumper reinforcement bent or curved in the lengthwise direction, but, for example, the invention is applicable to various types of structural members having a closed section, for example, a type which is straight in, for example, the lengthwise direction, and a type which is provided with a channel-shaped sectional portion 1 formed by bending a plate-shaped work W and closed sectional portions 2, 2 adjacent thereto.

Also, in the structural member, the vertical outer wall 13 may be omitted. In this case, a curved portion 16 will be formed, which is continuously formed from the contacted portion of the end faces Wa, Wa of both side edges to the longitudinal inner wall 12.

According to the first aspect of the invention, the end faces at both side edge portions, opposed to each other, of the work are caused to overlap the bottom wall of the channel-shaped sectional portion in a state where the end faces are brought into contact with each other. A closed sectional portion is formed so that the compression stress is remained at the curved portions continuously formed from the end faces of the side edge portions. Therefore, the shape of the closed sectional portion is kept unchanged, and the dimensional accuracy of the structural member can be improved.

According to the second aspect of the invention, when both side edges of the work are caused to overlap the bottom wall of the channel-shaped sectional portion in a state where the end faces of the channel-shaped sectional portion are brought into contact with each other, the end faces of the work can be securely opposed to each other by the fall-down prevention means. As a result, the compression Stress can be generated at the closed sectional portion without fail, maintaining high dimensional accuracy easily.

According to the third aspect of the invention, since the pre-step, intermediate step and post-step are systematically combined, it is possible to efficiently produce a structural member having a closed section with high accuracy.

According to one preferred form of the third aspect of the invention, as the work may be bent in the lengthwise direction in the pre-step or intermediate step, the work is not bent in the lengthwise direction in the post-step. Therefore, the sectional shape thereof is kept unchanged, ensuring accuracy of the entire structural member having closed sections.

What is claimed is:

1. A structural member formed of a plate-shaped and having a channel-shaped sectional portion and two closed sectional portions, each of said closed sectional portions including a side wall of said channel-shaped sectional portion, wherein said two closed sectional portions are formed so that ends thereof are next to a bottom wall of said channel-shaped sectional portion to overlap the bottom wall, wherein side edge portions of two of the closed sectional portions are bent to oppose the bottom wall and to contact each other, wherein each of said closed sectional portions has a planar portion adjacent to the side wall of said channel-shaped sectional portion and a curved portion disposed between said planar portion and said side edge portion, wherein said planar portion is connected to said side wall of said channel-shaped sectional portion at a right angle, and said curved portion is curved toward said planar portion in such a manner that said side edge portion is made into a top and that a compression stress remains in a curving direction between said planar portion and said side edge portion by interconnecting said side edge portions.

* * * * *